United States Patent
Schober (10) Patent No.: US 10,015,027 B2
(45) Date of Patent: Jul. 3, 2018

(54) APPARATUSES AND METHODS FOR ADDING OFFSET DELAYS TO SIGNAL LINES OF MULTI-LEVEL COMMUNICATION ARCHITECTURES

(71) Applicant: MICRON TECHNOLOGY, INC., Boise, ID (US)

(72) Inventor: Bruce W. Schober, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/531,558

(22) Filed: Nov. 3, 2014

(65) Prior Publication Data

US 2016/0119169 A1   Apr. 28, 2016

Related U.S. Application Data (60) Provisional application No. 62/067,157, filed on Oct. 22, 2014.

(51) Int. Cl.

| | | |
|---|---|---|
| *H04B 3/00* | (2006.01) | |
| *H04L 25/00* | (2006.01) | |
| *H04L 27/00* | (2006.01) | |
| *H04L 25/06* | (2006.01) | |
| *H04L 25/14* | (2006.01) | |
| *H04L 25/49* | (2006.01) | |

(52) U.S. Cl.
CPC ........ *H04L 27/0014* (2013.01); *H04L 25/061* (2013.01); *H04L 25/14* (2013.01); *H04L 25/4917* (2013.01)

(58) Field of Classification Search
CPC .. G06F 13/4282; G06F 13/40; Y02B 60/1235
See application file for complete search history.

(56) References Cited

U.S. PATENT DOCUMENTS 5,973,534 A   10/1999 Singh
6,028,449 A   2/2000 Schmitt
(Continued)

FOREIGN PATENT DOCUMENTS

TW   201602990 A   1/2016

OTHER PUBLICATIONS

U.S. Appl. No. 15/348,578 entitled 'Apparatuses and Methods for Power Efficient Driver Circuits' filed on Nov. 10, 2016.
(Continued)

*Primary Examiner* — Shuwang Liu
*Assistant Examiner* — Sung Ahn
(74) *Attorney, Agent, or Firm* — Dorsey & Whitney LLP (57) ABSTRACT

Apparatuses and methods for adding offset delays to signal lines of multi-level communication architectures are disclosed herein. An example method may include comparing a current channel state of a channel of a multi-level communication bus with a next channel state of the channel. The example method may further include, based on the comparison, applying an offset delay to a control signal configured to control transition of a signal line of the channel from a value associated with the current channel state to a value associated with the next channel state. The example method may further include after application of the offset delay, driving the signal line to the value associated with the next channel state responsive to the control signal.

19 Claims, 9 Drawing Sheets

(56) References Cited

U.S. PATENT DOCUMENTS

| | | | |
|---|---|---|---|
| 6,043,681 A | 3/2000 | Lim | |
| 8,013,648 B1* | 9/2011 | Lin | H03K 5/04 |
| | | | 327/170 |
| 8,437,343 B1* | 5/2013 | Wagh | G06F 13/385 |
| | | | 370/359 |
| 2004/0027163 A1 | 2/2004 | Carpenter et al. | |
| 2005/0068082 A1* | 3/2005 | Nguyen | G06F 1/06 |
| | | | 327/277 |
| 2005/0201491 A1* | 9/2005 | Wei | H04L 7/0337 |
| | | | 375/326 |
| 2006/0190203 A1* | 8/2006 | Cao | G01R 31/3004 |
| | | | 702/89 |
| 2006/0253816 A1* | 11/2006 | Gould | H04L 63/12 |
| | | | 326/46 |
| 2009/0267641 A1 | 10/2009 | Chen et al. | |
| 2011/0170644 A1* | 7/2011 | Iqbal | H04L 7/0337 |
| | | | 375/355 |
| 2011/0249520 A1 | 10/2011 | Kim | |
| 2013/0307583 A1* | 11/2013 | Hollis | H03K 19/0005 |
| | | | 326/30 |
| 2014/0003451 A1* | 1/2014 | Wagh | H04L 41/0896 |
| | | | 370/468 |
| 2015/0348491 A1 | 12/2015 | Kim et al. | |

OTHER PUBLICATIONS

U.S. Appl. No. 15/855,849, entitled "Apparatuses and Methods for Power Efficient Driver Circuits", filed Dec. 27, 2017.

* cited by examiner

| CHANNEL STATE | SIGNAL LINE VALUES<br>A, B, C<br>H = HIGH, L=LOW, I=INTERMEDIATE | DIFFERENTIAL SIGNAL VALUES<br>R_AB, R_BC, R_CA |
|---|---|---|
| +x<br>610 | H,L,I | 1,0,0 |
| -x<br>620 | L,H,I | 0,1,1 |
| +y<br>630 | I,H,L | 0,1,0 |
| -y<br>640 | I,L,H | 1,0,1 |
| +z<br>650 | L,I,H | 0,0,1 |
| -z<br>660 | H,I,L | 1,1,0 |

Min A Delay

| Next State | Current State | | | | | |
|---|---|---|---|---|---|---|
| | -x | +x | -y | +y | -z | +z |
| -x | 0 | 0 | 0 | 0 | 0 | 0 |
| +x | 0 | 0 | 0 | 0 | 0 | 0 |
| -y | 1 | 0 | 0 | 0 | 1 | 0 |
| +y | 0 | 1 | 0 | 0 | 0 | 1 |
| -z | 0 | 0 | 0 | 1 | 0 | 0 |
| +z | 0 | 0 | 1 | 0 | 0 | 0 |

Min B Delay

| Next State | Current State | | | | | |
|---|---|---|---|---|---|---|
| | -x | +x | -y | +y | -z | +z |
| -x | 0 | 0 | 0 | 0 | 0 | 0 |
| +x | 0 | 0 | 0 | 0 | 0 | 0 |
| -y | 0 | 0 | 0 | 1 | 0 | 0 |
| +y | 0 | 0 | 1 | 0 | 0 | 0 |
| -z | 1 | 0 | 0 | 0 | 0 | 0 |
| +z | 0 | 1 | 0 | 0 | 0 | 0 |

Min C Delay

| Next State | Current State | | | | | |
|---|---|---|---|---|---|---|
| | -x | +x | -y | +y | -z | +z |
| -x | 0 | 0 | 1 | 0 | 1 | 0 |
| +x | 0 | 0 | 0 | 1 | 0 | 1 |
| -y | 0 | 0 | 0 | 0 | 0 | 0 |
| +y | 0 | 0 | 0 | 0 | 0 | 0 |
| -z | 0 | 0 | 0 | 0 | 0 | 0 |
| +z | 0 | 0 | 0 | 0 | 0 | 0 |

Max A Delay

| Next State | Current State | | | | | |
|---|---|---|---|---|---|---|
| | -x | +x | -y | +y | -z | +z |
| -x | 0 | 0 | 0 | 0 | 0 | 0 |
| +x | 0 | 0 | 0 | 0 | 0 | 0 |
| -y | 0 | 1 | 0 | 0 | 0 | 1 |
| +y | 1 | 0 | 0 | 0 | 1 | 0 |
| -z | 0 | 0 | 1 | 0 | 0 | 0 |
| +z | 0 | 0 | 0 | 1 | 0 | 0 |

Max B Delay

| Next State | Current State | | | | | |
|---|---|---|---|---|---|---|
| | -x | +x | -y | +y | -z | +z |
| -x | 0 | 0 | 0 | 0 | 0 | 0 |
| +x | 0 | 0 | 0 | 0 | 0 | 0 |
| -y | 0 | 0 | 1 | 0 | 0 | 0 |
| +y | 0 | 0 | 0 | 1 | 0 | 0 |
| -z | 0 | 1 | 0 | 0 | 0 | 0 |
| +z | 1 | 0 | 0 | 0 | 0 | 0 |

Max C Delay

| Next State | Current State | | | | | |
|---|---|---|---|---|---|---|
| | -x | +x | -y | +y | -z | +z |
| -x | 0 | 0 | 0 | 1 | 0 | 1 |
| +x | 0 | 0 | 1 | 0 | 1 | 0 |
| -y | 0 | 0 | 0 | 0 | 0 | 0 |
| +y | 0 | 0 | 0 | 0 | 0 | 0 |
| -z | 0 | 0 | 0 | 0 | 0 | 0 |
| +z | 0 | 0 | 0 | 0 | 0 | 0 |

APPARATUSES AND METHODS FOR ADDING OFFSET DELAYS TO SIGNAL LINES OF MULTI-LEVEL COMMUNICATION ARCHITECTURES

CROSS REFERENCE TO RELATED APPLICATION(S)

This application claims benefit under 35 U.S.C. 119(e) to U.S. provisional patent application Ser. No. 62/067,157, entitled "APPARATUSES AND METHODS FOR ADDING OFFSET DELAYS TO SIGNAL LINES OF MULTI-LEVEL COMMUNICATION ARCHITECTURES" filed Oct. 22, 2014, which provisional application is incorporated herein by reference in its entirety for any purpose.

TECHNICAL FIELD

Embodiments of the disclosure relate generally to input/output (I/O) drivers, and more particularly, in one or more of the illustrated embodiments, to adding offset delays to signal lines of multi-level communication architectures.

BACKGROUND

The pursuit of making computing systems more powerful and more power efficient has led to advancement in interface communications to improve throughput without increasing, and ideally reducing, energy consumption. Often, as clock speeds increase, a desire to increase data transition times on interface busses to match the faster clock speeds exists. Some systems have implemented multi-level (e.g., more than two levels) bus architectures to increase throughput over an interface bus. However, an inherent characteristic of multi-level signals is that time shifts (e.g., jitter) may occur between consecutive symbols. That is, the timing between symbol transitions of the output signals determined from the signal line values may vary within a symbol period due to differences in transition magnitudes. For example, an output signal having a constant slew rate will take longer to transition between the max levels (e.g., VH to VL) than between a mid-level and a max level (e.g., VH/2 to VH). The inherent jitter may reduce the available setup and hold times between symbols, sometimes by as much as 20%. As clock speeds increase, the reduction of set-up and hold times can lead to reduced robustness and reliability in reading data on an interface using this type of system.

DETAILED DESCRIPTION

Certain details are set forth below to provide a sufficient understanding of embodiments of the disclosure. However, it will be clear to one having skill in the art that embodiments of the disclosure may be practiced without these particular details. Moreover, the particular embodiments of the present disclosure described herein are provided by way of example and should not be used to limit the scope of the disclosure to these particular embodiments.

Figure 1:
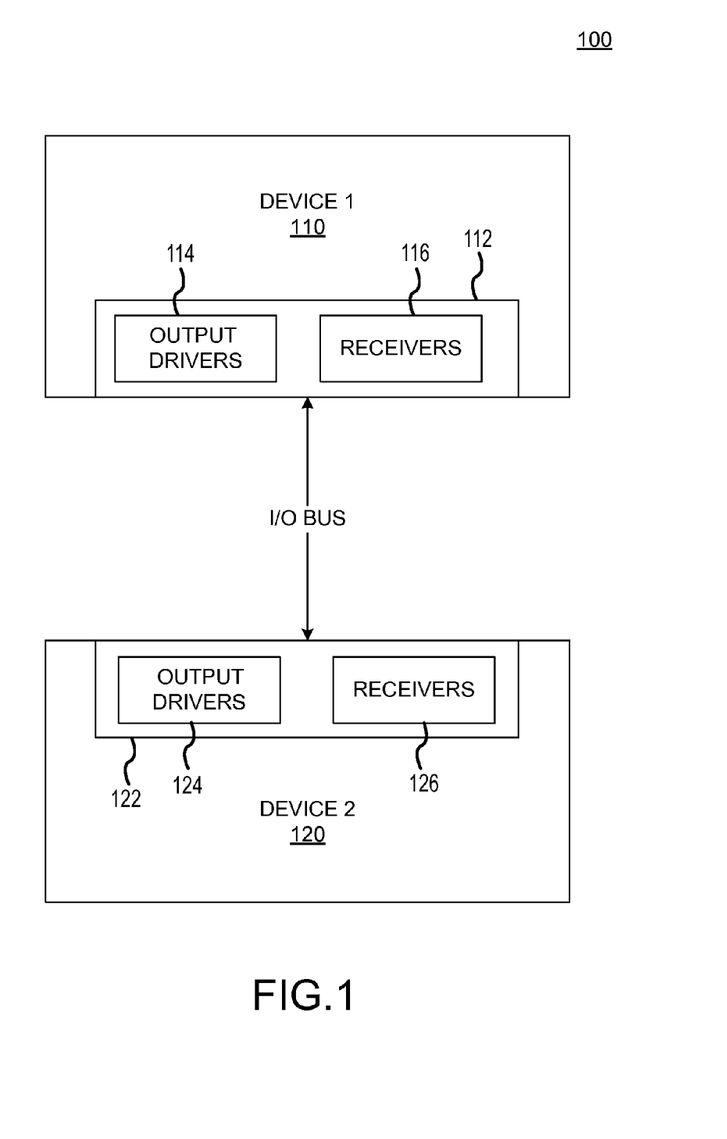
FIG. 1 is a block diagram of an apparatus according to an embodiment of the present disclosure.

FIG. 1 is a block diagram of an apparatus 100 according to an embodiment of the present disclosure. The apparatus 100 may include a first device 110 that communicates with a second device 120 over an input/output (I/O) bus. The first device 110 may include an I/O interface circuit 112 that includes output drivers 114 and receivers 116 for communication over the I/O bus. The second device 120 may include an I/O interface circuit 122 that includes output drivers 124 and receivers 126 for communication over the I/O bus. The I/O bus may support a multi-level communication architecture that includes a plurality of channels. In some embodiments, at least one channel may be single-ended and may include a single signal line. In some embodiments, at least one channel may be a differential channel and may include two or more signal lines. In one embodiment, the first device 110, the second device 120, and the I/O bus may support a pulse-amplitude modulation architecture (e.g., 4, 8, 16, etc., levels) and/or a MIPI alliance C-PHY architecture. The MIPI alliance C-PHY architecture uses a three-level, three-phase implementation with three signal lines per channel. In some examples, the first device 110 may include a memory controller or processing system and/or the second device 120 may include a memory, including volatile (e.g., flash) and/or non-volatile memory (e.g., RAM). In some examples, the second device 120 may include a dynamic random access memory (DRAM), such as a double-data-rate (DDR) DRAM or a low power DDR DRAM. It should be noted, however, that a memory is not a necessary component of the disclosure. Rather, the disclosure may be applied to any two or more devices, on or off-chip, that communicate with one another using multi-level signaling.

The output drivers 114 may include circuitry that applies a respective delay to offset inherent jitter within a symbol period of an output signal transition from a previous value to a next value. The output signal value may be determined from values on the signal line(s) of a channel, such as by comparison to a reference voltage or differentially by comparison with another signal line of the channel. Similarly, the output drivers 124 may include circuitry that applies a respective delay for each signal line of each channel to offset inherent jitter in the output signal transition from a current value to a next value. Selection of the respective delay by each of the output drivers 114 and the output drivers 124 may be based on a comparison of the current channel state to the next channel state.

For each channel, the receivers 116 may include one or more receivers configured to determine output signal values associated with each channel based on signal line value provided by the output drivers 124. Further, the receivers 126 may include one or more differential receivers configured to determine output signal values associated with each channel based on signal line values provided by the output drivers 114. In some embodiments, the receivers 116 and the receivers 126 may include differential receivers configured to compare a signal line value to a reference value or configured to compare a signal line value of a channel to another signal line value of the channel.

In operation, the first device 110 and the second device 120 may communicate over the I/O bus to transfer information, such as data, addresses, commands, etc. While the I/O bus is shown to be bidirectional, the I/O bus may also be a unidirectional bus. The I/O interface circuit 112 and I/O interface circuit 122 may implement a multi-level communication architecture. In a multi-level communication architecture, a symbol is sent over a channel during a symbol period. A symbol may be a single value on a signal line of a channel, or may be a combination of values provided on a plurality of signal lines of a channel. The symbol may represent a channel state. A receiver may determine an output signal value based on the value transmitted on the signal line(s) of a channel. In a differential architecture, differential output signal values may be determined from the signal line values of a channel. In a single-ended architecture, the signal line value may be compared against one or more reference values to determine the output signal value. A receiver has a time period to determine and latch the output signal value from the time the output signal transitions to the current value to the time the output signal transitions to the next value. The transition time may be determined based on an edge crossing. An edge crossing may include a point through which an output signal must cross when changing from one logical value to another (e.g., from a logical low value to a logical high value, or vice versa). For example, an edge crossing may be an intermediate point between a high voltage level VH and a low voltage level VL. For a signal, a time between edge crossings of consecutive symbol periods may be a setup and hold time period. Ideally, the time period between transition times (e.g., the setup and hold time) is consistent between symbol periods.

Figure 8:
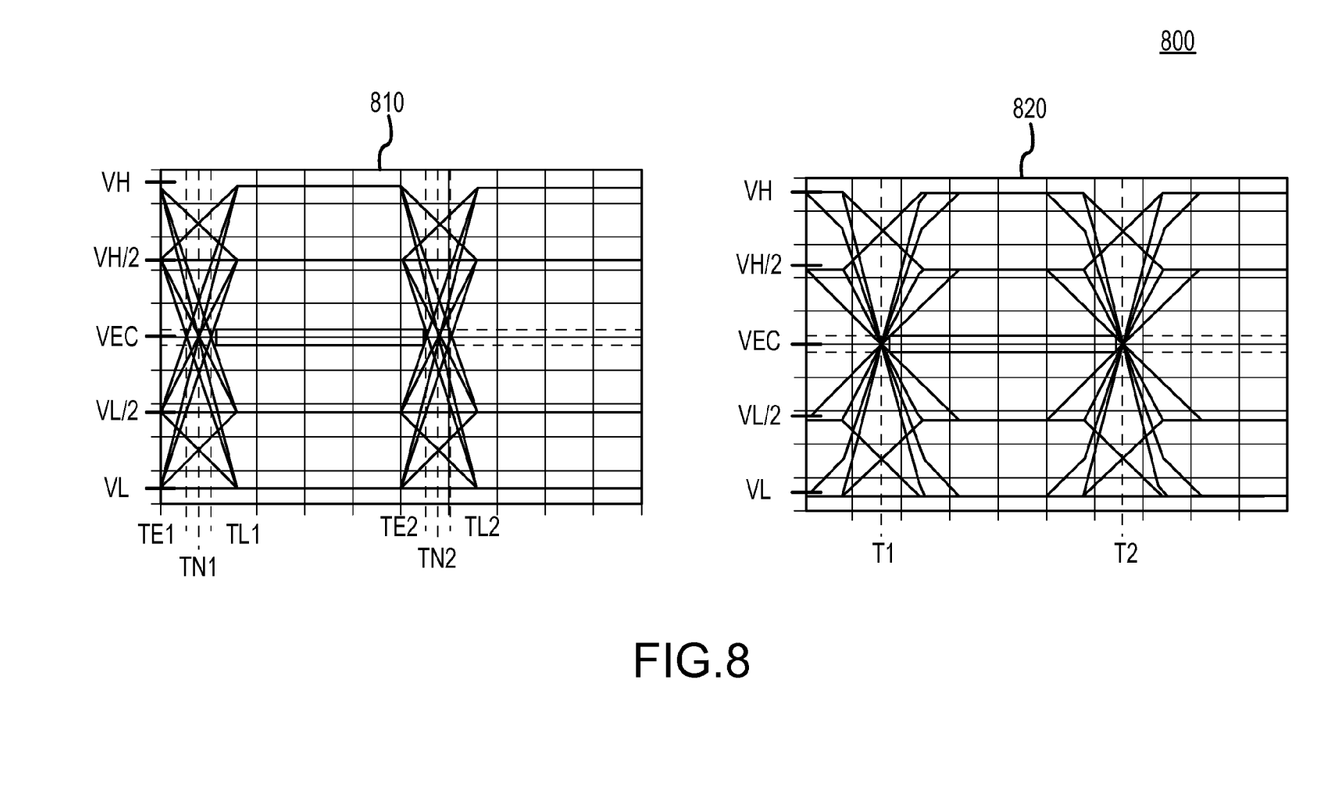
FIG. 8 includes exemplary eye diagrams for the differential signal R_AB of the apparatus 500 according to an embodiment of the disclosure.

However, in a multi-level communication architecture with a fixed slew rate or fixed rise/fall times, inherent time shifts (e.g., jitter) between transition times for an output signal may result from differences in transition magnitudes from a previous value to a next value. For example, a transition from the low voltage level VL to the high voltage level VH may have a transition time within the symbol period that is different than a transition time within the same symbol period of a signal transitioning from a low voltage level VL to a mid-high voltage level VH/2. The time shifts within a symbol period may affect the setup and hold time between symbol periods, sometimes by as much as 20%. In some examples, a count of potential different transition times within a symbol period may be based on a count of possible absolute transition magnitudes in the multi-level communication architecture. For example, when a multi-level communication architecture defines three differential magnitude transitions in an output signal (e.g., |VH−VL|, |VH/2−VL|, and |VH/2−VL/2|), there may be three different inherent transition times. The amount of jitter or time shifting may be based on the slew rate, the rise/fall times, the multi-level magnitudes values, or combinations thereof. In some examples, the transition times may also be affected by process, voltage, and temperature variations. Diagram 810 of FIG. 8 provides an example of time shifting for a particular differential output signal, which includes three transition times (e.g., crossing the edge crossing VEC) for each symbol period (TE1, TN1, and TL1 for the first symbol period, and TE2, TN2, and TL2 for the second symbol period).

To reduce or eliminate the inherent jitter, the output drivers 114 or the output drivers 124 may include circuitry to introduce respective offset delays to one or more signal lines of a channel. The offset delays may adjust the timing of transitions of a signal line from a current value to a next value as transmitted over the I/O bus. The delay offset for each signal line of a channel is set independent of offset delays for other signals lines of the channel and independent of other signals lines of other channels. That is, a signal line of a channel may have a different offset delay than other signal lines of the channel. Further, the offset delay for a signal line is determined at each symbol period independent of the delay offset from any the previous symbol period. Thus, the delay offset for a signal line may change or stay the same from one symbol period to the next based on the comparison between channel states. The adjusted timing may reduce or eliminate the undesirable time shifting of an output signal value transition within a symbol period (e.g., provide consistent transition times), and make the setup and hold time periods consistent between symbol periods. The offset delays may be based on a comparison of a current channel state to a next channel state. The length of delay offsets that are selectable by the output drivers 114 and 124 may be determined based on the slew rate, the rise/fall times, the multi-level magnitudes values, or combinations thereof. In some examples, the lengths may be adjusted in situ based differences caused by process, voltage, and/or temperature variations.

The receivers 116 or the receivers 126 may receive one or more signals for each channel via the I/O bus. In some examples, the receivers 116 or the receivers 126 may include a respective one or more differential amplifiers for each channel. In some embodiments, during the setup and hold time period the one or more differential amplifiers for a channel may receive the respective signals and provide differential or quasi-differential output signal value(s) for each channel based on comparison of signal line values within a channel. In some embodiments, during the setup and hold time period the one or more differential amplifiers for a channel may receive the respective signals and provide output signal values based on comparison of a signal line value of a channel with one or more reference values. In some examples, the receivers 116 or receivers 126 may latch the output signal value(s) for each channel. The first device 110 or the second device 120, respectively, may determine the next channel state for each channel based on the respective output signal value(s). In some examples, the multi-level communication architecture may include an embedded clock by requiring a channel state change during every symbol period, which may cause the output signal values of the channel to change with every symbol period. Thus, the receivers 116 or receivers 126 may use the transitions to detect a new value, rather than detecting new values responsive to a separate clock signal.

Figure 2:
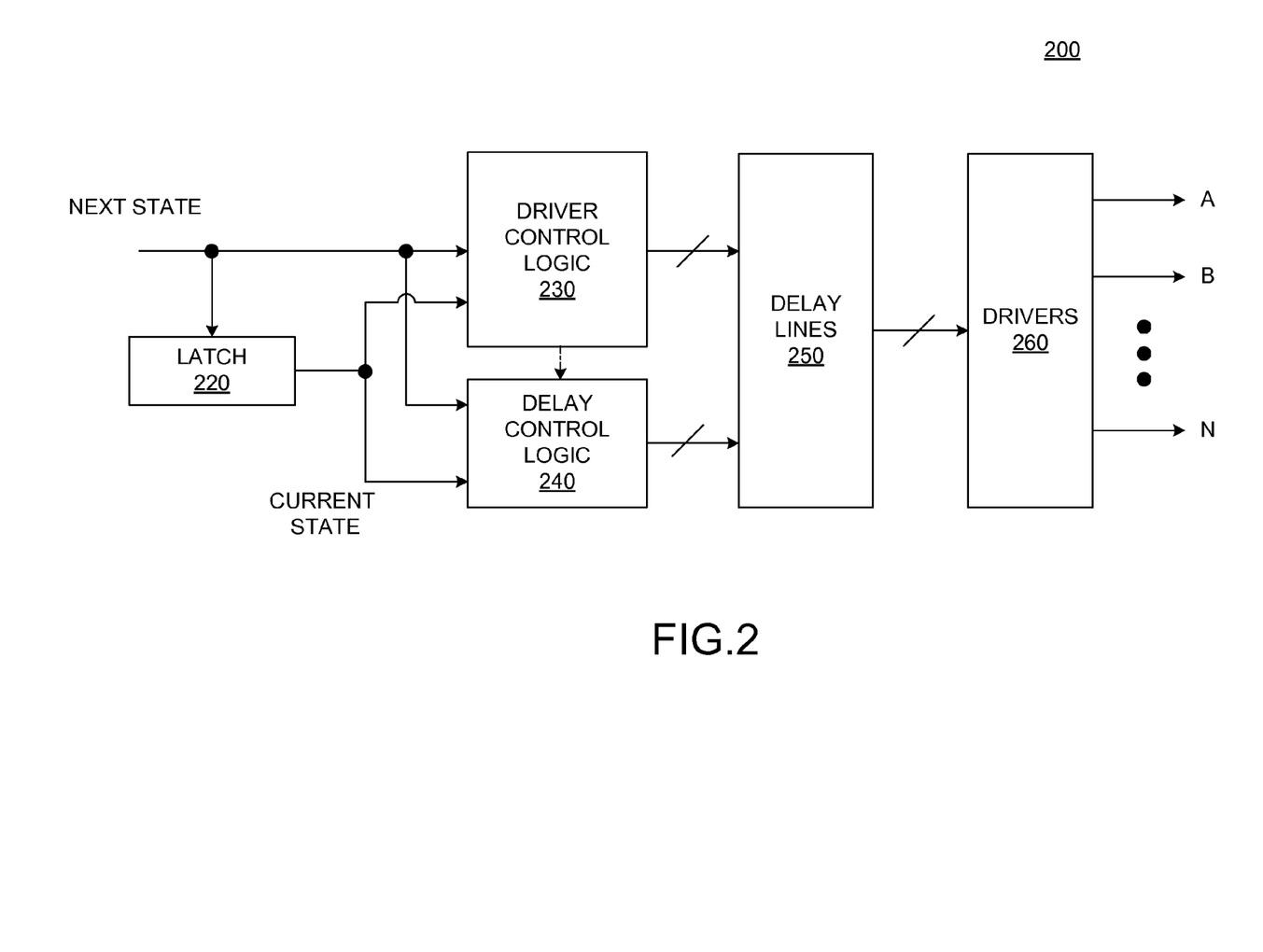
FIG. 2 is a block diagram of an output driver circuit for a single channel according to an embodiment of the present disclosure.

FIG. 2 is a block diagram of an output driver circuit 200 for a single channel including signals lines A-N according to an embodiment of the present disclosure. The output driver circuit 200 may include a latch 220 that latches a current channel state. The output driver circuit 200 may further include a driver control logic 230 that provides control signal values to control drivers 260 to drive signal lines A-N based on the next channel state. The control signal lines may be delayed through delay lines 250 between the driver control logic 230 and the drivers 260. The output driver circuit 200 may further include delay control logic 240 that controls a delay of the control signals through the delay lines 250. The drivers 260 may drive the signal lines A-N for a channel based on the control signal values from the delay lines 250. A-N may represent any number of signal lines including one, two, or more signal lines. The output driver circuit 200 may be implemented in the output drivers 114 and/or the output drivers 124 of FIG. 1 for one or more of the channels of the I/O bus.

The driver control logic 230 and delay control logic 240 may each receive the next channel state from another circuit, such as another circuit in the first device 110 or the second device 120. In some embodiments, the driver control logic 230 may determine whether the next channel state is a valid state value and/or may determine whether the next channel state following the current channel state is a valid sequence according to a defined specification or standard. The driver control logic 230 may provide control signals to control the drivers 260 to drive the signal lines A-N according to the next channel state. In some embodiments, each control signal may correspond to a respective one of the signal lines A-N.

The delay control logic 240 may compare the next channel state to the current channel state received from the latch 220. The delay control logic 240 may provide a delay control signal for each of the control signals provided by the driver control logic 230 based on the comparison of the next channel state to the current channel state. The delay control signals may be used by the delay lines 250 to select which delay circuit of the delay lines 250 is applied to each respective control signal. The delay circuit selected may be based on a predetermined relationship between the next channel state and the current channel state. In some embodiments, the delay control logic 240 may select the delay control signal value from a lookup table or state machine.

In operation, the output driver circuit 200 may receive the next channel state for a channel at the driver control logic 230 and delay control logic 240 at a start of a symbol period. The driver control logic 230 may determine a value for each of the control signals based on the next channel state to provide to the drivers 260. The drivers 260 may drive the signal lines A-N to values according to the next channel state. The driver control logic 230 may provide the control signals to the delay lines 250.

The delay lines 250 may include a set of selectable delay circuits for each control signal that are controlled by a respective delay control signal from the delay control logic 240. The selectable delay circuits of the delay lines 250 may reduce inherent jitter in output signal values determined from the signal lines A-N at a receiver, such as the receivers 116 or the receivers 126 of FIG. 1. The inherent jitter may be caused by transition timing differences of the output signals from one value to another based on a change in the signal line values. That is, the selectable delay circuits of the delay lines 250 may control the transition timing of the output signal values within a symbol period based on transition of the values of the signals lines A-N. The transition timing may be adjusted by the delay lines 250 such that the transition time occurs at approximately the same time within a symbol period for each symbol period. The delay control logic 240 may determine a value for each of the delay control signals based on a comparison between the next channel state and the current channel state. In some embodiments, the delay control logic 240 may include a lookup table or state machine to select values for the set of delay control signals based on the current channel state and the next channel state. In some examples, the delay control logic 240 and the driver control logic 230 may include shared logic that is used for providing the control signals for the drivers 260 and for providing the delay control signals for the delay lines 250. In some examples, the driver control logic 230 may provide the current channel state and the next channel state to the delay control logic 240.

The delay lines 250 may select a respective delay circuit for each of the control signals based on a respective delay control signal. The length of delay of each delay circuit of the delay lines 250 may be determined based on the slew rate, a rise/fall time, and magnitudes of the levels of the multi-level communication architecture. In some examples, the length of delay of each delay circuit of the delay lines 250 may be adjusted in situ based differences caused by process, voltage, and/or temperature variations. The delay lines 250 may provide the delayed control signals to the drivers 260. The drivers 260 may drive the signal lines A-N to values based on the delayed control signals. In some examples, the drivers 260 may include pull-up and pull-down circuits to drive the signals lines A-N.

Figure 3:
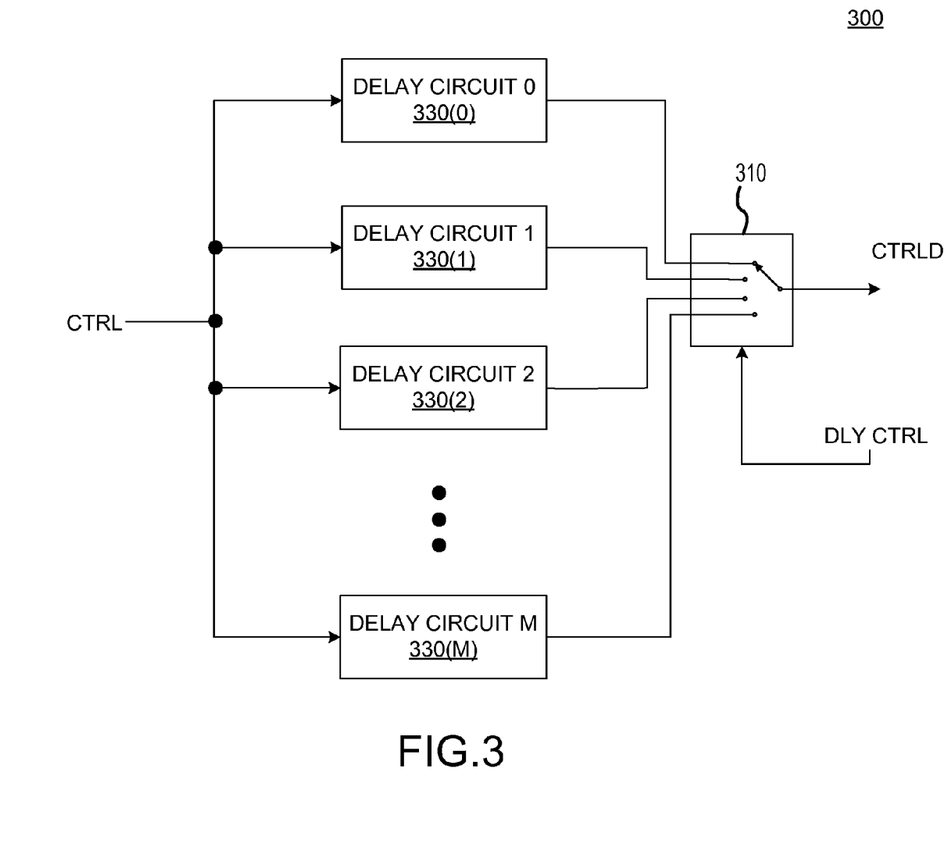
FIG. 3 is a block diagram of a delay line circuit 300 according to an embodiment of the present disclosure.

FIG. 3 is a block diagram of a delay line circuit 300 for a single control signal, such as a control signal provided by the driver control logic 230 of FIG. 2, according to an embodiment of the present disclosure. The delay line circuit 300 may be implemented in the output drivers 114 or the output drivers 124 of FIG. 1 and/or the delay lines 250 of FIG. 2. The delay line circuit 300 may include delay circuits 0-M 330(0-M) each configured to receive a control signal CTRL and provide a respective delayed control signal to a switch 310. The switch 310 may receive a delay control signal DLY CTRL, and may select a delayed CTRL signal to provide at an output as the CTRLD signal based on a value of the DLY CTRL signal. In some examples, one of the delay circuits 0-M 330(0-M) may apply little or no delay to the CTRL signal. For example, a signal line designated with a late transition time may have no delay applied, while signals with other transition time designations (e.g., early or nominal) may have a corresponding amount of delay applied. In other examples, a default amount of delay may be applied that corresponds to nominal transition time designations, and earlier transition time designations may have more delay applied and late transition time designations may have less delay applied.

The count of the delay circuits 0-M 330(0-M) may be based on a count of possible magnitude transitions of an output signal value in the multi-level communication architecture. The delay values of each of the delay circuits 0-M 330(0-M) may be determined based on the slew rate, a rise/fall time, and magnitudes of the levels of the multi-level communication architecture. In some embodiments, the delay line circuit 300 may include two, three, or more than four delay circuits 0-M 330(0-M). In some examples, the length of delay of the delay circuits 0-M 330(0-M) may be adjusted in situ based differences caused by process, voltage, and/or temperature variations.

The block diagram of the delay line circuit 300 is a functional block diagram. It is appreciated that one of skill in the art would recognize the delay line circuit 300 could be implemented in any number of ways, including separate delay circuits, a single delay line that has an adjustable delay (e.g., via an RC circuit, etc.), or other circuits or combinations of circuits configured for generating different selectable delays lengths.

Figure 4A:
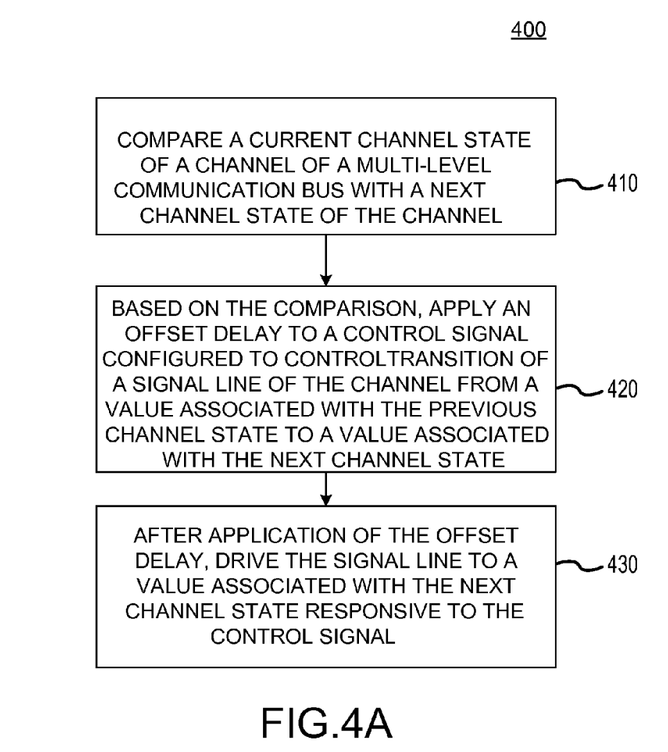
FIG. 4A is a flowchart of a method for applying an offset delay to a signal line an embodiment of the disclosure.

FIG. 4A is a flowchart of a method 400 for applying an offset delay to a signal line in an embodiment of the disclosure. The method 400 may be implemented using the output drivers 114 or the output drivers 124 of FIG. 1, the output driver circuit 200 of FIG. 2, the delay line circuit 300 of FIG. 3, or combinations thereof.

The method 400 may include comparing a current channel state of a channel of a multi-level communication bus with a next channel state of the channel, at 410. Comparison of the current channel state with the next channel state may be performed by the output drivers 114 and/or the output driver 124 of FIG. 1, and/or the delay control logic 240 of FIG. 2.

The method 400 may further include, based on the comparison, applying an offset delay to a control signal configured to control a transition of a signal line of the channel from a value associated with the current channel state to a value associated with the next channel state, at 420. Application of the offset delay may be performed by the output drivers 114 and/or the output driver 124 of FIG. 1, the delay lines 250 of FIG. 2, and/or the delay line circuits 300 of FIG. 3. In some embodiments, the method 400 may further include selecting a delay circuit of a plurality of delay circuits based on the comparison. The selected delay circuit may be configured to apply the offset delay to the control signal. Selection of the delay circuit of the plurality of delay circuits based on the comparison may include activating a switch, such as the switch 310 of FIG. 3, to select the delay circuit responsive to a delay control signal. The switch may be activated based on a delay control signal, such as a delay control signal provided by the delay control logic 240 of FIG. 2. In some embodiments, the method 400 may further include providing the control signal configured to control the transition of the signal line to the selected delay circuit having a value based on the next channel state, such as from the driver control logic 230 of FIG. 2.

The method 400 may further include, after application of the offset delay, driving the signal line to the value associated with the next channel state responsive to the control signal, at 430. In some embodiments, the method 400 may further include latching the next channel state after driving the signal line to the value associated with the next channel state. Latch of the next channel state may be performed by an receiver, such as the receivers 116 and/or the receivers 126 of FIG. 1. Latch of the next channel state may include determining an output signal value from the value of the signal line. The next channel state may be determined and latched based on the output signal value.

Figure 4B:
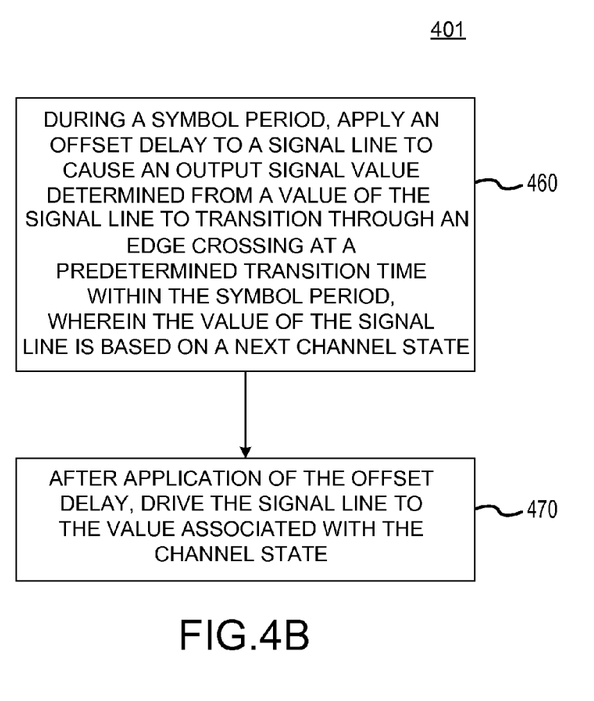
FIG. 4B is a flowchart of a method for applying an offset delay to a signal line an embodiment of the disclosure.

FIG. 4B is a flowchart of a method 401 for applying an offset delay to a signal line an embodiment of the disclosure. The method 401 may be implemented using the output drivers 114 or the output drivers 124 of FIG. 1, the output driver circuit 200 of FIG. 2, the delay line circuit 300 of FIG. 3, or combinations thereof.

The method 401 may include, during a symbol period, applying an offset delay to a signal line to cause an output signal value determined from the signal line value to transition through an edge crossing at a predetermined transition time within the symbol period, wherein the value of the signal line is based on a next channel state, at 460. Application of the offset delay may be performed by the output drivers 114 or the output drivers 124 of FIG. 1, the delay lines 250 of FIG. 2, the delay line circuit 300 of FIG. 3, or combinations thereof. In some embodiments, the method 401 may further include selecting the offset delay based on a comparison of a current channel state with the next channel state. Selection of the offset delay may be performed by the output drivers 114 or the output drivers 124 of FIG. 1, the delay control logic 240 and the delay lines 250 of FIG. 2, the delay line circuit 300 of FIG. 3, or combinations thereof. Comparison of the current channel state with the next channel state may be performed by the output drivers 114 and/or the output driver 124 of FIG. 1, and/or the delay control logic 240 of FIG. 2.

The method 400 may further include, after application of the offset delay, driving the signal line to the value associated with the next channel state, at 470. In some embodiments, the method 401 may further include determining the output signal value from the value driven on the signal line to determine the next channel state.

The method 400 may further include, after application of the offset delay, driving the signal line to the value associated with the next channel state responsive to the control signal, at 430. The method 400 may further include latching the next channel state after driving the signal line to the value associated with the next channel state. Latch of the next channel state may be performed by an receiver, such as the receivers 116 and/or the receivers 126 of FIG. 1. Latch of the next channel state may include determining an output signal value from the value of the signal line. The next channel state may be determined and latched based on the output signal value. Determination of the output signal value from the value driven on the signal line to determine the next channel state may be based on comparison of the value of the signal line with a reference value, in some examples. In other examples, determination of the output signal value from the value driven on the signal line to determine the next channel state may be based on comparison of the value of the signal line with a value of another signal line of the channel.

The methods 400 and 401 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods 400 and 401 may be implemented by a computing apparatus using, for example, one or more processing units that may execute instructions for performing the method that may be encoded on a computer readable medium. The processing units may be implemented using, e.g. processors or other circuitry capable of processing (e.g. one or more controllers or other circuitry). The computer readable medium may be transitory or non-transitory and may be implemented, for example, using any suitable electronic memory, including but not limited to, system memory, flash memory, solid state drives, hard disk drives, etc.

Figure 5:
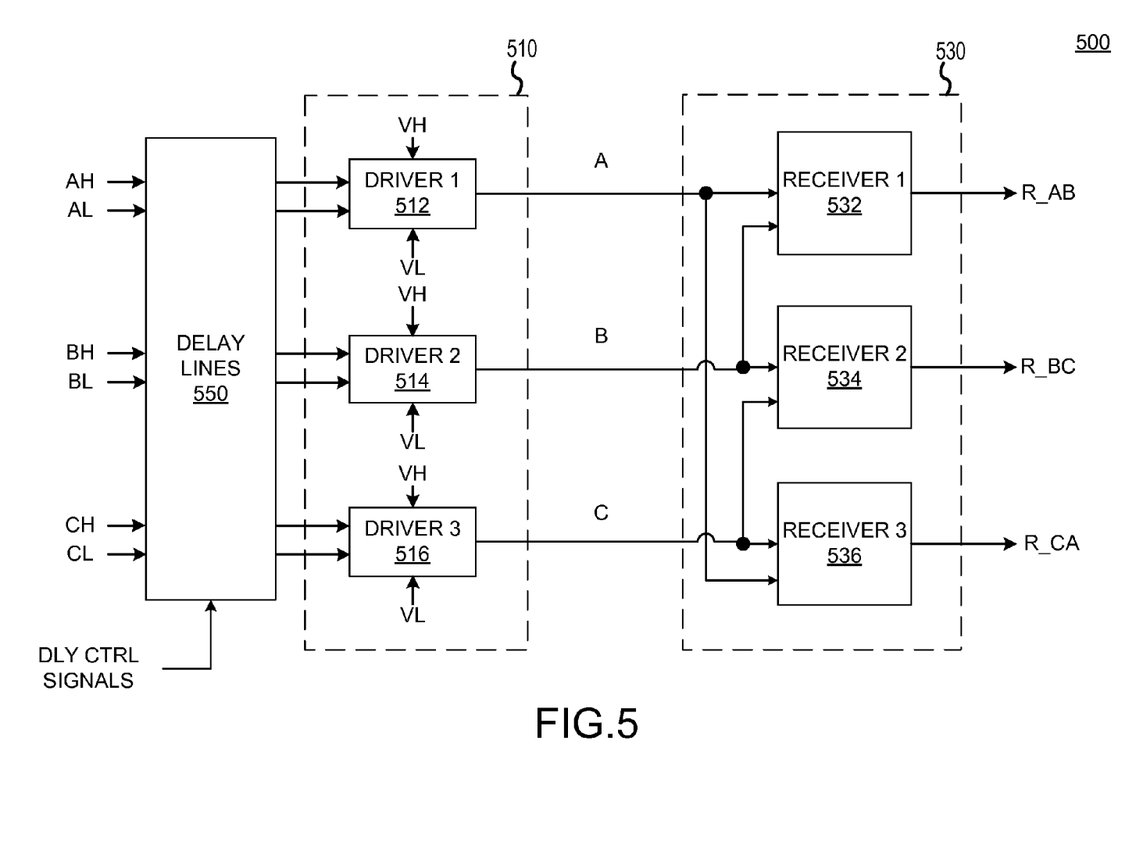
FIG. 5 is a block diagram of apparatus 500 according to an embodiment of the disclosure.
Figure 6:
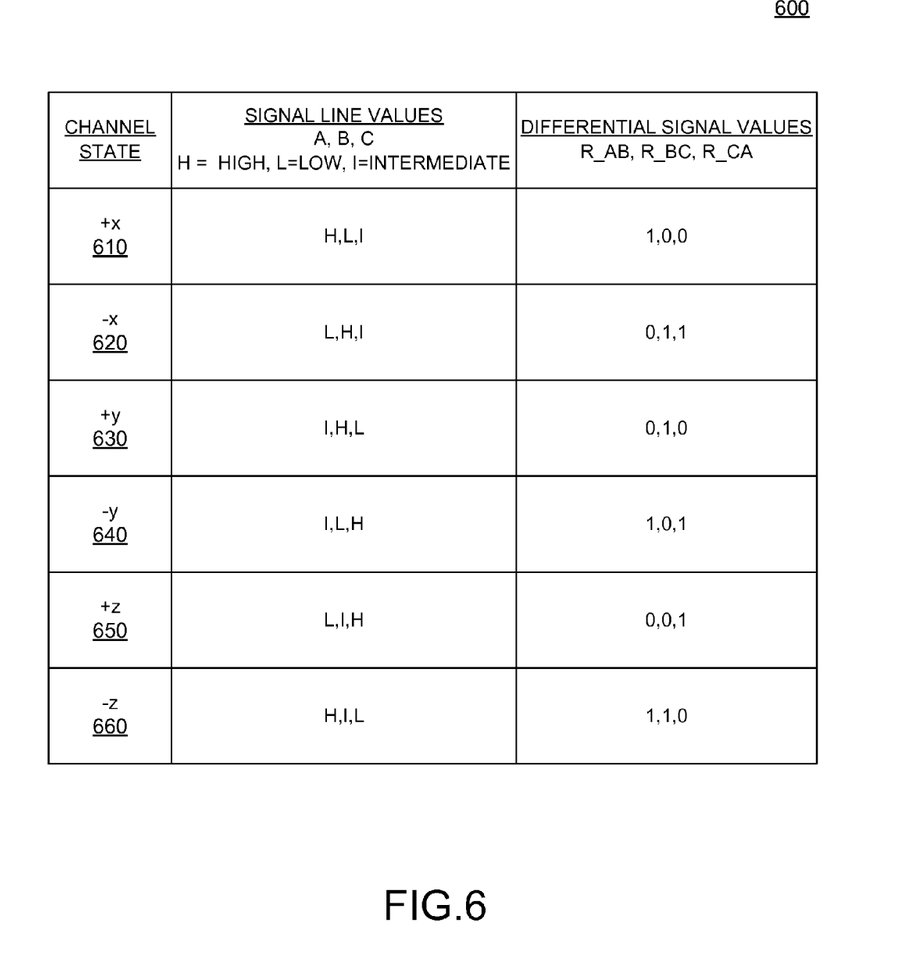
FIG. 6 is a table of a set of channel states of the apparatus 500 according to an embodiment of the disclosure.
Figure 7:
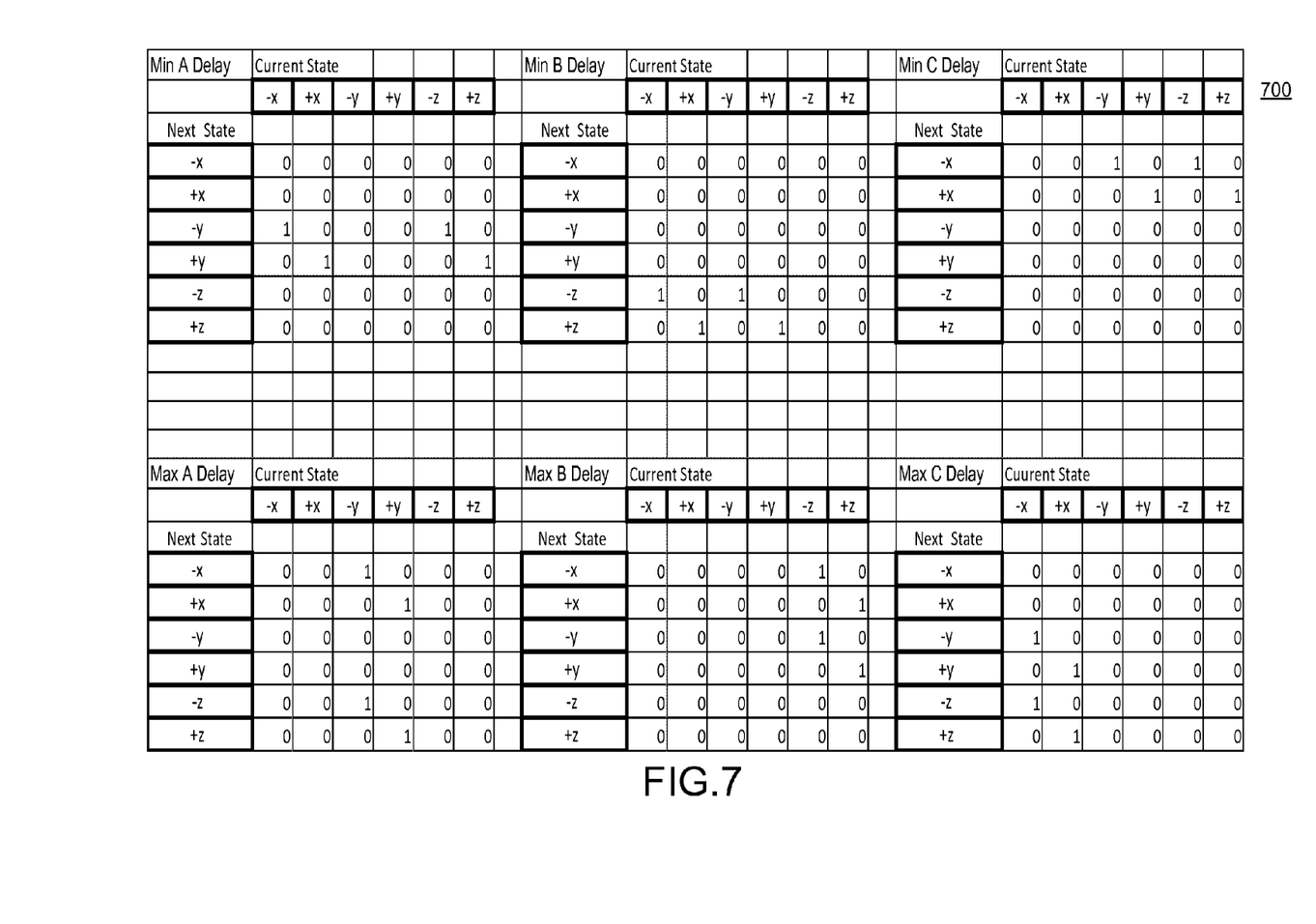
FIG. 7 is a lookup table for each of the A-C signal lines of the apparatus 500 according to an embodiment of the disclosure.

FIGS. 5-7 depict a specific implementation according to an embodiment of the disclosure associated with MIPI C-PHY architecture. MIPI C-PHY is a three-phase, quasi-differential system. FIG. 5 is a block diagram of apparatus 500 according to an embodiment of the disclosure. The apparatus 500 includes an output driver circuit 510 coupled to delay lines 550, and a receiver circuit 530 for a single channel of an I/O bus. The delay lines 550 and the output driver circuit 510 may be implemented in the output drivers 114 and/or the output drivers 124 of FIG. 1 and/or the drivers 260 of FIG. 2. The delay lines 550 may use the delay line circuit 300 of FIG. 3 and/or may be implemented in the delay lines 250 of FIG. 2. The receiver circuit 530 may be implemented in the receivers 116 and/or the receivers 126 of FIG. 1.

The delay lines 550 may receive six control signals AH, AL, BH, BL, CH, and CL. The delay lines 550 may delay each of the six control signals AH, AL, BH, BL, CH, and CL based on the delay control signals DLY CNTRL. The DLY CNTRL signals may be provided by delay control logic, such as the delay control logic 240 of FIG. 2. The delay lines 550 may provide the six delayed control signals AH, AL, BH, BL, CH, and CL to the output driver circuit 510.

The output driver circuit 510 may include a first driver 512 configured to receive delayed AH and AL signals, a second driver 514 configured to receive delayed BH and BL signals, and a third driver 516 configured to receive delayed CH and CL signals. The drivers 512, 514, and 516 may drive the signals lines A-C, respectively, based on the respective control signals AH, AL, BH, BL, CH, and CL.

The receiver circuit 530 may further include a first receiver 532, a second receiver 534, and a third receiver 536. The first receiver 532 may be configured to receive the signal lines A and B, and may be configured to provide an output signal R_AB having a value based on a comparison (e.g., a quasi-differential comparison) of the values of the signal lines A and B. The second receiver 534 may be configured to receive the signal lines B and C, and may be configured to provide an output signal R_BC having a value based on a comparison (e.g., a quasi-differential comparison) of the values of the signal lines B and C. The third receiver 536 may be configured to receive the signal lines C and A, and may be configured to provide an output signal R_CA having a value based on a comparison (e.g., a quasi-differential comparison) of the values of the signal lines C and A.

The MIPI C-PHY standard specifies that one of the signal lines A-C is pulled-up to the high voltage VH, one of the signal lines A-C is pulled down to the low voltage VL, and the remaining signal line is at an intermediate value between the VH and VL (neither pulled up nor pulled down). Thus, the possible differential signal R_AB, R_BC, and R_CA voltage differences may be one of VH (e.g., logical one value), VH/2 (e.g., logical one value), VL (e.g., logical zero value), or VL/2 (e.g., logical zero value). FIG. 6 includes a table 600 of each possible channel state of the apparatus 500 according to an embodiment of the disclosure. Table 600 shows the values of the signal lines A-C and the resultant differential signal R_AB, R_BC, and R_CA values. The +x state 610 may result in differential signal values of (1,0,0). The −x state 620 may result in differential signal values of (0,1,1). The +y state 630 may result in differential signal values of (0,1,0). The −y state 640 may result in differential signal values of (1,0,1). The +z state 650 may result in differential signal values of (0,0,1). The −z state 660 may result in differential signal values of (1,1,0).

The apparatus 500 implementing the MIPI C-PHY architecture may result in inherent jitter associated with three different edge crossing times within a symbol period: an early crossing time, a nominal crossing time, and a late crossing time. FIG. 8 includes an exemplary eye diagram 810 depicting the three edge crossing times within a symbol period. To compensate for the inherent jitter, the delay lines 550 may apply a delay to each control signal AH, AL, BH, BL, CH, and CL. FIG. 7 depicts a lookup table for each of the A-C signal lines according to an embodiment of the disclosure. The lookup table 700 may be used to determine an edge crossing time adjustments (e.g., minimum delay, nominal delay, or maximum delay) to the signal lines A-C based on the current channel state and the next channel state. A "1" indicates that the delay time is selected for a signal. For example, in the "Min A Delay" table, the A signal causes an late edge crossing time requiring a minimal delay adjustment when transitioning from the −x state to the −y state, from the +x state to the +y state, from the −z state to the −y state, and from the +z state to the +y state. The min, nominal, or max delay designations pulled from the lookup tables 700 may be used by delay control logic, such as the delay control logic 240 of FIG. 2, to determine which delay circuit of the delay lines 550, such as the delay circuits 330(0-M) of FIG. 3, to select for each of the control signals AH, AL, BH, BL, CH, and CL. Selection may be indicated by the DLY CTRL signals. Note that if a signal line A-C is not indicated as min or max, then the signal line A-C may have the nominal delay time. For the C-PHY system, the max delay time may be two delay units, the nominal delay time may be one delay unit, and the min delay time may be zero delay units. A delay unit may be half of the time it takes to transition from the VEC level to the VH level in a fixed rise-time system.

In a three phase or more differential architectures, the delay adjustments may be based on voltage change of a differential signal, which may be a combination of two input signals, one or both of which may be used for other differential signals in the system. For example, in the C-PHY system, each of the three differential signals R_AB, R_BC, and RCA are generated from a combination of two of the three input signals A, B, and C. Thus, adjusting timing of one input signal correct an edge crossing timing of a first differential signal may affect an edge crossing timing of a second differential signal. Therefore adjustment of timing of input signals in three phase or more differential architectures may require taking effects of timing changes to input signals on every differential signal generated from the input signal.

To reduce a likelihood of adversely affecting timing of one differential signal to another differential signal in a three-phase system, construction of a lookup table (e.g., table 700) may be determined as follows: 1) Identify the differential transitions having an edge crossing that occurs early or late. 2) For each of the edge crossing transitions that occur early or late, identify which of the two signals that make up the differential signal that swings to or from a mid-level voltage (e.g., to or from the intermediate voltage I from table 600). 3) If the edge crossing is an early crossing, then the max delay may be applied to the signal that is identified to transition to or from the mid-level voltage. Otherwise, if the edge crossing is a late crossing, then the min delay may be applied to the signal that is identified to transition to or from the mid-level voltage. The other signal used to generate the differential signal may be set to the nominal delay.

As an example, for signal R_AB transitioning from the +x state to the +y state, the R_AB signal transitions from a VH−VL differential to a VI−VH differential (determined from table 6), which may result in a late crossing. Because the transition results in a late crossing, the component signals transitions are analyzed. From table 6, the A signal transitions from the high voltage VH to the intermediate voltage VI, and the B signal transitions from the low voltage VL to the high voltage VH. Because the signal A is a partial transition to the mid-level voltage (e.g., the intermediate voltage VI), and the R_AB signal is late, the minimal delay may be applied to the signal A, and a nominal delay may be applied to the signal B.

As previously described, FIG. 8 includes exemplary eye diagrams for the one of the differential signals R_AB, R_BC, or R_CA of the apparatus 500 according to an embodiment of the disclosure. Diagram 810, with no offset delay, depicts edge crossings at times TE1, TN1, and TL1 during a first symbol period, and edge crossings at times TE2, TN2, and TL2 during a second symbol period. The variation in edge crossing times reduces the setup and hold time to between the TL1 and TE2 times. Diagram 820, with offset delays applied via the delay lines 550, depicts a single edge crossing at time T1 during the first symbol period, and a single edge crossing at time T2 during the second symbol period. Eliminating the jitter caused by the different edge crossings times shown in chart 810 may allow the setup and hold time between the first symbol period and the second symbol period to be greater (e.g., time between T1 and T2 in diagram 820 is greater than time between TL1 and TE2 in diagram 810). In a MIPI C-PHY implementation for charts 810 and 820, the VL voltage is a negative complement of the VH voltage, the VL/2 voltage is a negative complement of the VH/2 voltage, and the VEC voltage is zero volts.

Figure 9:
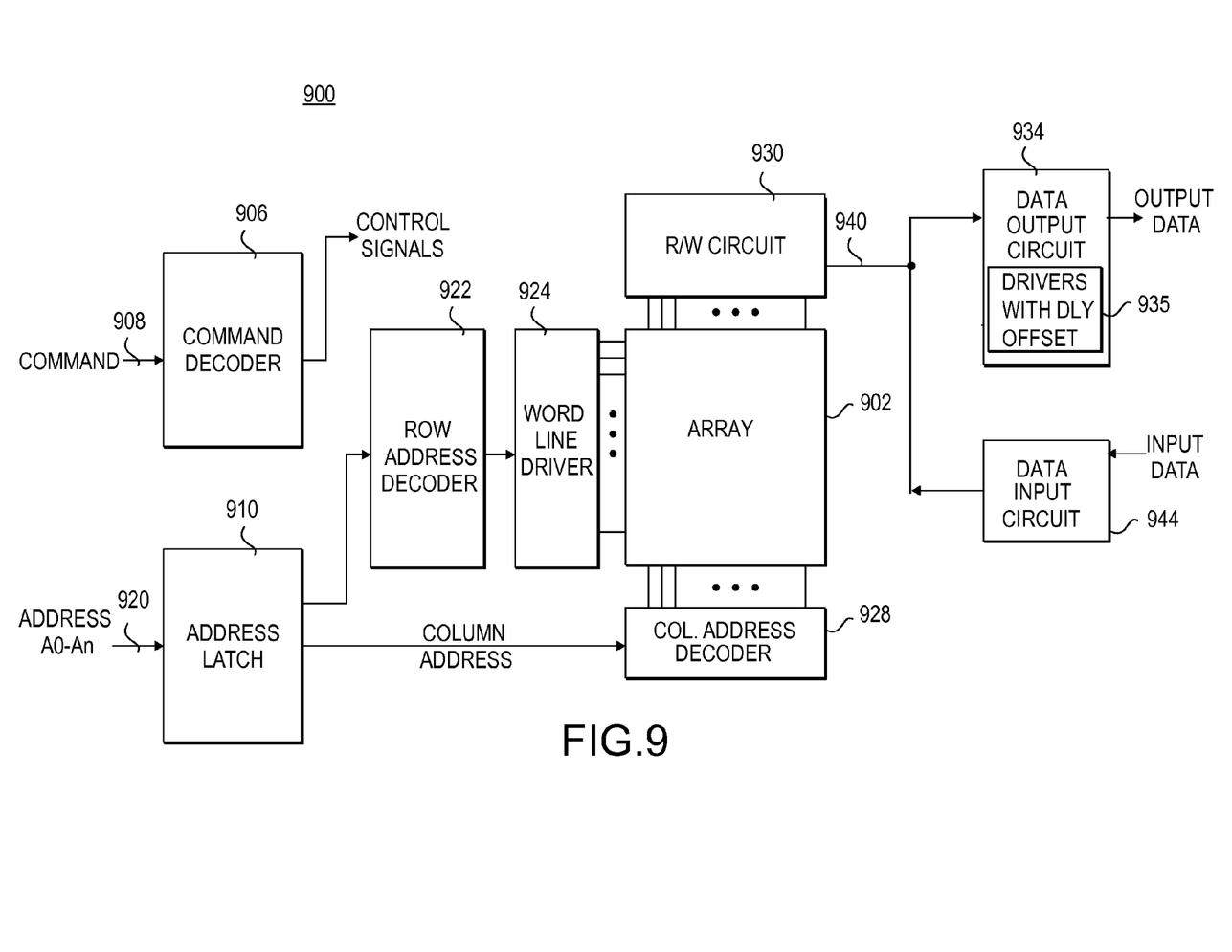
FIG. 9 is a block diagram of a portion of a memory according to an embodiment of the present disclosure.

FIG. 9 illustrates a portion of a memory 900 according to an embodiment of the present disclosure. The memory 900 includes an array 902 of memory cells, which may be, for example, volatile memory cells, non-volatile memory cells, DRAM memory cells, SRAM memory cells, flash memory cells, or some other types of memory cells. The memory 900 includes a command decoder 906 that receives memory commands and addresses through an ADDR/CMD bus. The command decoder 906 provides control signals, based on the commands received through the ADDR/CMD bus. The command decoder 906 also provides row and column addresses to the memory 900 through an address bus and an address latch 910. The address latch then outputs separate column addresses and separate row addresses.

The row and column addresses are provided by the address latch 910 to a row address decoder 922 and a column address decoder 928, respectively. The column address decoder 928 selects bit lines extending through the array 902 corresponding to respective column addresses. The row address decoder 922 is connected to word line driver 924 that activates respective rows of memory cells in the array 902 corresponding to received row addresses. The selected data line (e.g., a bit line or bit lines) corresponding to a received column address are coupled to a read/write circuitry 930 to provide read data to a data output circuit 934 via an input-output data bus 940. The data output circuit 934 may include drivers with offset delays 935 that are configured to control timing of transitions of signal lines on the output data bus. The drivers with offset delays 935 may include the output drivers 114 and/or the output drivers 124 of FIG. 1, the output driver circuit 200 of FIG. 2, the delay line circuit 300 of FIG. 3, the delay lines 550 and/or the output driver circuit 510 of FIG. 5, or combinations thereof. The drivers with offset delays 935 may be configured to perform the method 400 and/or the method 401 of FIG. 4. Write data are provided to the array 902 through a data input circuit 944 and the memory array read/write circuitry 930. The command decoder 906 responds to memory commands and addresses provided to the ADDR/CMD bus to perform various operations on the array 902. In particular, the command decoder 906 is used to provide control signals to read data from and write data to the array 902.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus, comprising:
   an output driver circuit configured to drive a channel based on a current channel state and a next channel state using a multi-level communication architecture including a Mobile Industry Processor Interface (MIPI) Alliance C-PHY physical layer architecture, the output driver circuit configured to determine whether a transition from the current channel state to the next channel state is a valid sequence according to a standard that defines the MIPI Alliance C-PHY physical layer architecture, wherein the output driver circuit further configured to, in response to a determination that the transition from the current channel state to the next channel state is a valid sequence, apply a first offset delay to delay transition of a first signal line of the channel to a value associated with the next channel state based on a comparison between the next channel state and the current channel state, the output driver circuit further configured to drive the first signal line to the value associated with the next channel state, wherein, in response to the determination that the transition from the current channel state to the next channel state is a valid sequence, the output driver circuit is further configured to apply a second offset delay to delay transition of a second signal line of the channel to a value associated with the next channel state based on the comparison between the next channel state and the current channel state, wherein the first offset delay is different than the second offset delay, and wherein the output driver circuit includes a delay line that includes a plurality of delay circuits, wherein the delay line is configured to select a delay circuit of the plurality of delay circuits based on the comparison between the next channel state and the current channel state.

2. The apparatus of claim 1, wherein the output driver circuit includes delay control logic configured to select the first and second offset delays from a lookup table based on the comparison between the next channel state and the current channel state.

3. The apparatus of claim 1, wherein the output driver circuit includes driver control logic configured to provide a control signal having a value based on the next channel state, wherein the first and second offset delays are applied the control signal, wherein the output driver circuit drives the values of the first and second signal lines based on the control signal after application of the first and second offset delays.

4. The apparatus of claim 3, wherein the output driver circuit includes a driver configured to receive the control signal after application of the first and second offset delays, wherein the driver is configured to drive the values on the first and second signal lines based on the control signal.

5. An apparatus, comprising:
   an output driver circuit configured to drive first and second signal lines of a channel based on a channel state using a multi-level communication architecture including a Mobile Industry Processor Interface (MIPI) Alliance C-PHY physical layer architecture, within a symbol period, the output driver circuit configured to determine whether a transition from a current channel state to a next channel state is a valid sequence according to a standard that defines the MIPI Alliance C-PHY physical layer architecture, and in response to a determination that the transition from the current channel state to the next channel state is a valid sequence, apply a first offset delay to a first signal line and to apply a second offset delay to a second signal line, wherein the first offset delay causes a first output signal value determined from the first signal line value to transition through an edge crossing at a predetermined transition time within the symbol period and wherein the second offset delay causes a second output signal value determined from the second signal line value to transition through the edge crossing at the predetermined transition time within the symbol period, the output driver circuit further configured to drive the first and second signal lines to a respective value associated with the channel state after application of the first and second offset delays, wherein the first and second offset delays are different; and a receiver circuit configured to receive a first signal on the first signal line and to provide the output signal having a value based on the value of the first signal line, and wherein the output driver circuit is configured to select the first and second offset delays based on a comparison of a next channel state with a current channel state.

6. The apparatus of claim 5, wherein the output driver circuit configured to select the first and second offset delays comprises selection of the first and second offset delays from a lookup table based on the comparison of the next channel state with the current channel state.

7. The apparatus of claim 5, wherein the multi-level communication architecture is a differential architecture, and wherein the channel includes a plurality of signal lines, wherein the receiver circuit is configured to provide the output signal having a value that is based on a comparison of two signal lines of the plurality of signal lines.

8. The apparatus of claim 5, wherein the multi-level communication architecture includes pulse-amplitude modulation.

9. The apparatus of claim 5, wherein the value of associated with the next channel state is one of three voltage values.

10. A method, comprising:
determining whether a transition of a channel of a multi-level communication architecture bus from the current channel state to the next channel state is a valid sequence according to a standard that defines the Mobile Industry Processor Interface (MIPI) Alliance C-PHY physical layer architecture;

in response to a determination that the transition from the current channel state to the next channel state is a valid sequence, comparing the current channel state with the next channel state of the channel;

based on the comparison, selecting a delay circuit of a first plurality of delay circuits, wherein the selected delay circuit of the first plurality of delay circuits is configured to apply a first offset delay to a first control signal configured to control a transition of a first signal line of the channel from a value associated with the current channel state to a value associated with the next channel state;

based on the comparison, selecting a delay circuit of a second plurality of delay circuits, wherein the selected delay circuit of the second plurality of delay circuits is configured to apply a second offset delay to a second control signal configured to control a transition of a second signal line of the channel from a value associated with the current channel state to a value associated with the next channel state, wherein the first and second offset delays are different;

after application of the first and second offset delays, driving the first and second signal lines to the values associated with the next channel state responsive to the first and second control signals, and wherein the multi-level communication architecture includes the MIPI Alliance C-PHY physical layer architecture.

11. The method of claim 10, wherein selecting the delay circuits of the first and second plurality of delay circuits based on the comparison comprises activating a switch to select the delay circuits responsive to a delay control signal.

12. The method of claim 11, further comprising providing the first and second control signals to the selected delay circuits having a value based on the next channel state.

13. The method of claim 10, further comprising latching the next channel state after driving the first and second signal lines to the valued associated with the next channel state.

14. The method of claim 13, wherein latching of the next channel state comprises determining output signal values from the values of the first and second signal lines, wherein next channel state is determined and latched based on the output signal values.

15. A method, comprising:
during a symbol period associated with a channel of a multilevel communication architecture including a Mobile Industry Processor Interface (MIPI) Alliance C-PHY physical layer architecture, determining whether a transition from the current channel state to the next channel state is a valid sequence according to a standard that defines the MIPI Alliance C-PHY physical layer architecture;

during the symbol period, in response to a determination that the transition from the current channel state to the next channel state is a valid sequence, applying a first offset delay to a first signal line to cause a first output signal value determined from a value of the first signal line to transition through an edge crossing at a predetermined transition time within the symbol period, wherein the value of the first signal line is based on the next channel state;

during the symbol period, in response to a determination that the transition from the current channel state to the next channel state is a valid sequence, applying a second offset delay to a second signal line to cause a second output signal value determined from a value of the second signal line to transition through the edge crossing at the predetermined transition time within the symbol period, wherein the value of the second signal line is based on the next channel state and wherein the first and second offset delays are different; and after application of the first and second offset delays, driving the first and second signal lines to the values associated with the next channel state.

16. The method of claim 15, further comprising selecting the first and second offset delays based on a comparison of a current channel state with the next channel state.

17. The method of claim 15, further comprising determining the first and second output signal values from the values driven on the first and second signal lines to determine the next channel state.

18. The method of claim 17, wherein determining the first and second output signal values from the values driven on the first and second signal lines to determine the next channel state is based on comparison of the values of the first and second signal lines with a reference value.

19. The method of claim 17, wherein determining the first and second output signal values from the values driven on the first and second signal lines to determine the next channel state is based on comparison of the values of the first and second signal lines with a value of another signal line of the channel.

* * * * *